(12) United States Patent
Rihani et al.

(10) Patent No.: US 10,409,589 B2
(45) Date of Patent: Sep. 10, 2019

(54) APPLICATION CENTRIC CONTINUOUS INTEGRATION AND DELIVERY WITH AUTOMATED SERVICE ASSURANCE

(71) Applicant: Accenture Global Solutions Limited, Dublin (IE)

(72) Inventors: Raed Zahi Rihani, Falls Church, VA (US); Stefan C. Hellstrom, Denver, CO (US); Christopher Ray Brown, Springfield, VA (US); Michael Laflamme, Bentonville, AR (US); Jonovan J. Sanders, Silver Spring, MD (US); Ashley N. Porta, Philadelphia, PA (US); Ken A. Pham, Washington, DC (US); Christina Alexandria Rodgers, Washington, DC (US); Michael Phannareth, Burke, VA (US); Alex Kendis, New York, NY (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/647,697

(22) Filed: Jul. 12, 2017

(65) Prior Publication Data

US 2018/0060066 A1     Mar. 1, 2018

Related U.S. Application Data

(60) Provisional application No. 62/361,153, filed on Jul. 12, 2016.

(51) Int. Cl.
*G06F 8/71* (2018.01)
*G06F 9/455* (2018.01)
(Continued)

(52) U.S. Cl.
CPC ............ *G06F 8/71* (2013.01); *G06F 9/45558* (2013.01); *G06F 8/41* (2013.01); *G06F 8/60* (2013.01);
(Continued)

(58) Field of Classification Search
CPC ..... G06F 8/41; G06F 8/60; G06F 8/71; G06F 11/3688
(Continued)

(56) References Cited

U.S. PATENT DOCUMENTS 6,968,535 B2 * 11/2005 Stelting .................... G06F 8/10
717/104
8,020,144 B2 * 9/2011 Yang .......................... G06F 8/20
717/106
(Continued)

FOREIGN PATENT DOCUMENTS

AU     2012/0276003     1/2013

OTHER PUBLICATIONS

Fathi et al., "Advanced Condition Monitoring Services in Product Lifecycle Management", 2007, IEEE (Year: 2007).*
(Continued)

*Primary Examiner* — Qing Chen
*Assistant Examiner* — Junchun Wu
(74) *Attorney, Agent, or Firm* — Brinks Gilson & Lione (57) ABSTRACT

An application-centric continuous delivery (ACCID) architecture provides a service that automates the configuration and management of end-to-end application lifecycle management (ALM) tools, through an innovative application-centric metadata model that can be customized through a self-service portal. With the ACCID architecture, IT organizations can provide version management, build automation, test automation, artifact management, infrastructure build, and automated application deployment that is consis-
(Continued)

tent with global IT policy and governance and delivered as a service to organizations. The ACCID architecture references customized application metadata models that describe the application services, ALM requirements, and target infrastructure, to employ end-to-end automation of: the software deployment lifecycle and promotion across application environments, e.g., Development, Test, Pre-Production, and Production environments, using private, public, or hybrid cloud deployment models.

21 Claims, 6 Drawing Sheets (51) Int. Cl.
G06F 8/60 (2018.01)
G06F 11/36 (2006.01)
G06F 8/41 (2018.01)

(52) U.S. Cl.
CPC .................. G06F 11/3688 (2013.01); G06F 2009/45562 (2013.01)

(58) Field of Classification Search
USPC .......................................................... 717/121
See application file for complete search history.

(56) References Cited

U.S. PATENT DOCUMENTS

| | | | |
|---|---|---|---|
| 8,443,355 B2* | 5/2013 | Wiese .................. G06Q 10/06 717/121 |
| 8,677,309 B2* | 3/2014 | Xie ........................ G06F 8/10 717/101 |
| 8,752,014 B2* | 6/2014 | Harmon .............. G06F 9/44505 717/121 |
| 9,201,639 B2* | 12/2015 | Kumar ..................... G06F 8/61 |
| 9,354,851 B2* | 5/2016 | Li ............................ H04L 67/10 |
| 9,575,979 B1* | 2/2017 | McClintock ......... G06F 21/6218 |
| 9,614,781 B1 | 4/2017 | Goltzman et al. |
| 9,830,146 B2* | 11/2017 | Rector ..................... G06F 8/71 |
| 10,084,723 B2* | 9/2018 | Mordani .............. H04L 47/827 |
| 2008/0077605 A1 | 3/2008 | Vasu |
| 2008/0104573 A1* | 5/2008 | Singla ...................... G06F 8/71 717/120 |
| 2009/0144393 A1 | 6/2009 | Kudo |
| 2010/0050156 A1* | 2/2010 | Bonanno ................. G06F 8/71 717/122 |
| 2010/0122248 A1* | 5/2010 | Robinson ............... G06F 9/485 718/1 |
| 2011/0099548 A1* | 4/2011 | Shen ................... G06F 9/45558 718/1 |
| 2011/0107327 A1 | 5/2011 | Barkie et al. |
| 2012/0036245 A1* | 2/2012 | Dare ........................ G06F 8/60 709/223 |
| 2012/0174079 A1* | 7/2012 | Luh .......................... G06F 8/30 717/135 |
| 2013/0007216 A1 | 1/2013 | Fries et al. |
| 2013/0346616 A1 | 2/2013 | Miki et al. |
| 2013/0262638 A1 | 10/2013 | Kumarasamy et al. |
| 2013/0297973 A1* | 11/2013 | Hyland ................. G06F 11/28 714/27 |
| 2013/0298104 A1* | 11/2013 | Kletsky .................. G06F 8/70 717/102 |
| 2014/0006342 A1 | 1/2014 | Love et al. |
| 2014/0040328 A1 | 2/2014 | Offer |
| 2014/0189671 A1* | 7/2014 | Dujmovic ................ G06F 8/65 717/168 |
| 2014/0245290 A1* | 8/2014 | Gupta ....................... G06F 8/61 717/178 |
| 2014/0331240 A1* | 11/2014 | Zhao ........................ G06F 9/541 719/328 |
| 2015/0019479 A1 | 1/2015 | Buehne et al. |
| 2015/0052531 A1 | 2/2015 | Helak et al. |
| 2015/0074659 A1* | 3/2015 | Madsen ................... G06F 8/61 717/177 |
| 2015/0096011 A1 | 4/2015 | Watt |
| 2015/0372878 A1 | 12/2015 | Ganesan et al. |
| 2016/0225403 A1 | 8/2016 | Hostetter et al. |
| 2017/0012819 A1* | 1/2017 | Raheja .................. G06F 9/5072 |
| 2017/0161057 A1* | 6/2017 | Khazanchi ............... G06F 8/70 |
| 2017/0206017 A1 | 7/2017 | Sun et al. |
| 2017/0212732 A1 | 7/2017 | Kaduwela et al. |
| 2017/0286456 A1* | 10/2017 | Wenzel ............. G06F 17/30294 |

OTHER PUBLICATIONS

Srinivasan, "An integration framework for product lifecycle management", Aug. 2007, Elsevier (Year: 2007).*
Abramovici et al., "Application of PDM technology for Product Life Cycle Management", 1997, Springer Link (Year: 1997).*
Candido et al., "Service-Oriented Infrastructure to Support the Deployment of Evolvable Production Systems", Nov. 2011, IEEE, vol. 7, No. 4 (Year: 2011).*
Australian Patent Office, Examination Report No. 1 for Australia Patent Application No. 2017245281 dated Mar. 7, 2018, pates 1-6.
U.S. Appl. No. 15/725,477, filed Oct. 5, 2017, Rihani et al.
U.S. Appl. No. 62/361,153, filed Jul. 12, 2016, Rihani et al.
European Patent Office, Extended European Search Report from European Patent Application No. 17195639.4 dated Mar. 16, 2018, pp. 1-7.
Non-Final Office Action in U.S. Appl. No. 15/725,477, dated Oct. 15, 2018, pp. 1-33.
Examination Report No. 3 in Australia application No. 2017245281, dated Nov. 23, 2018, pp. 1-3.
Examination Report No. 2 for Australian Application No. 2017245281 dated Jun. 19, 2018, pp. 1-4.
Non-Final Office Action for U.S. Appl. No. 15/725,477 dated Jun. 18, 2019.
Final Office Action for U.S. Appl. No. 15/725,477 dated Apr. 8, 2019.

* cited by examiner

APPLICATION CENTRIC CONTINUOUS INTEGRATION AND DELIVERY WITH AUTOMATED SERVICE ASSURANCE

PRIORITY CLAIM

This application claims priority to U.S. provisional application No. 62/361,153, filed 12 Jul. 2016.

TECHNICAL FIELD

This disclosure relates to the configuration and execution of end-to-end application lifecycle management tools.

BACKGROUND

The processing power, memory capacity, available disk space, and other resources available to computer systems have increased exponentially in recent decades. Diverse computer systems are deployed worldwide in great numbers to host an immense number of data platforms running extremely diverse applications. Improvements in application configuration and execution will further drive the adoption and advance the capabilities of these computer systems.

DETAILED DESCRIPTION

The architecture described below provides application-centric continuous integration and delivery (ACCID). The use of self-service and automation in ACCID helps to make application development tools, specifically continuous integration and continuous delivery (CI/CD), widely available to the developer community as Enterprise Services. ACCID thereby drives greater efficiency and agility in the frequency of releases, increases the stability of systems, and increases in the maintainability of production systems, while reducing wasteful duplication of tools. The architecture may deliver ACCID as a service to enterprises to facilitate accomplishing many different technical tasks, including automating the configuration and management of end-to-end application lifecycle management (ALM) tools. In one implementation, the architecture references an innovative application-centric metadata model that can be customized through a self-service portal. Through ACCID, IT departments may provide version management, build automation, test automation, artifact management, infrastructure build, and automated software deployment as a service consistent with global IT policy and governance as defined by any given enterprise or organization.

The metadata model specifically describes the application services, ALM requirements and configuration, target infrastructure, and enterprise policy and governance requirements to deliver enterprise consistent and correct end-to-end automation of application characteristics. For instance, ACCID may reference the metadata model and implement end-to-end automation of the software deployment lifecycle or execution of software testing. ACCID may also handle promotion across application environments, using public, private, or hybrid cloud deployment models. ACCID makes possible delivering services such as version control, build management, with automated testing, artifact management, infrastructure provisioning, and code deployment and promotion available to the developer communicate using as "As-A-Service" delivery model.

Figure 1:
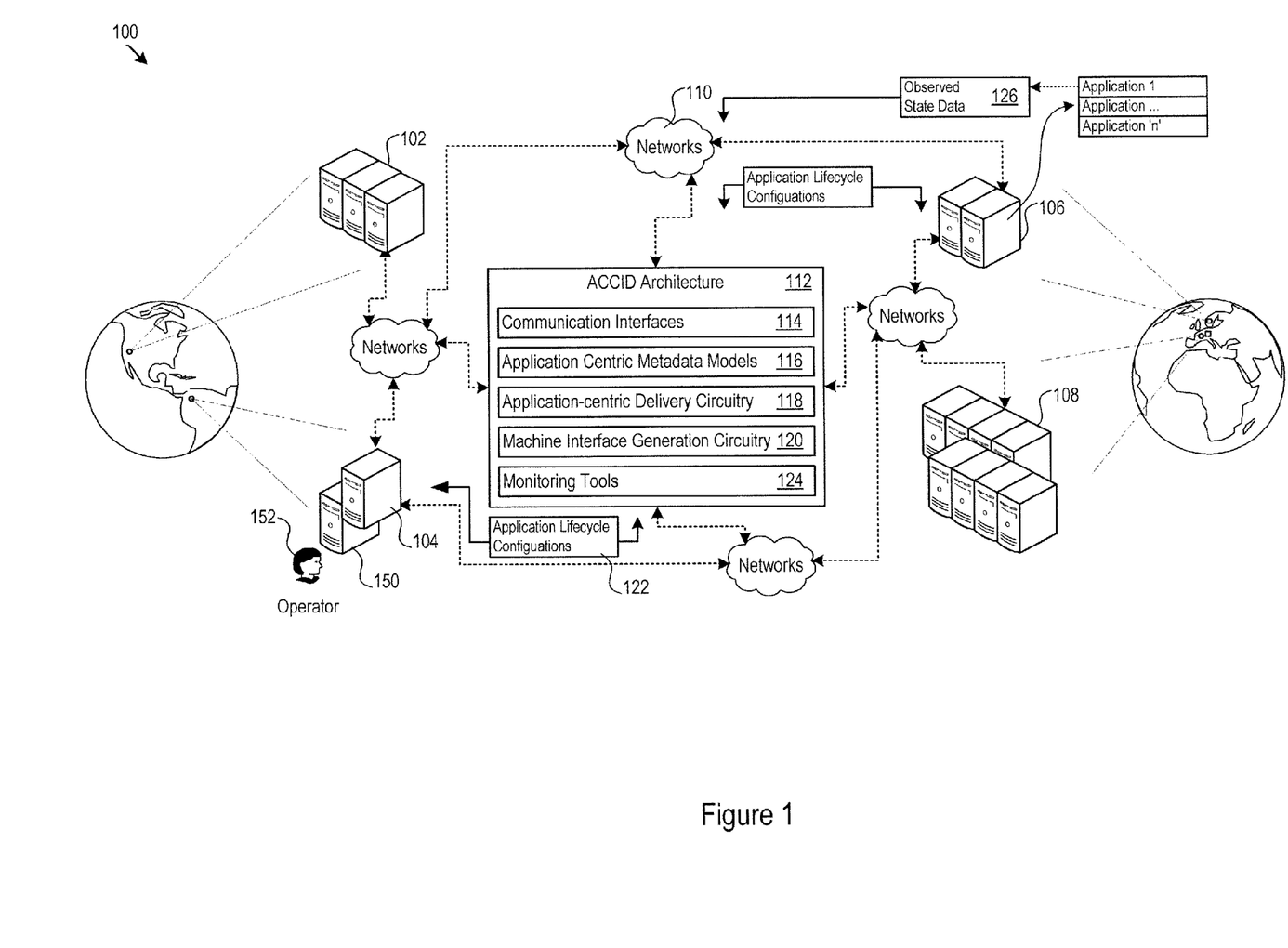
FIG. 1 shows a global network architecture.
Figure 2:
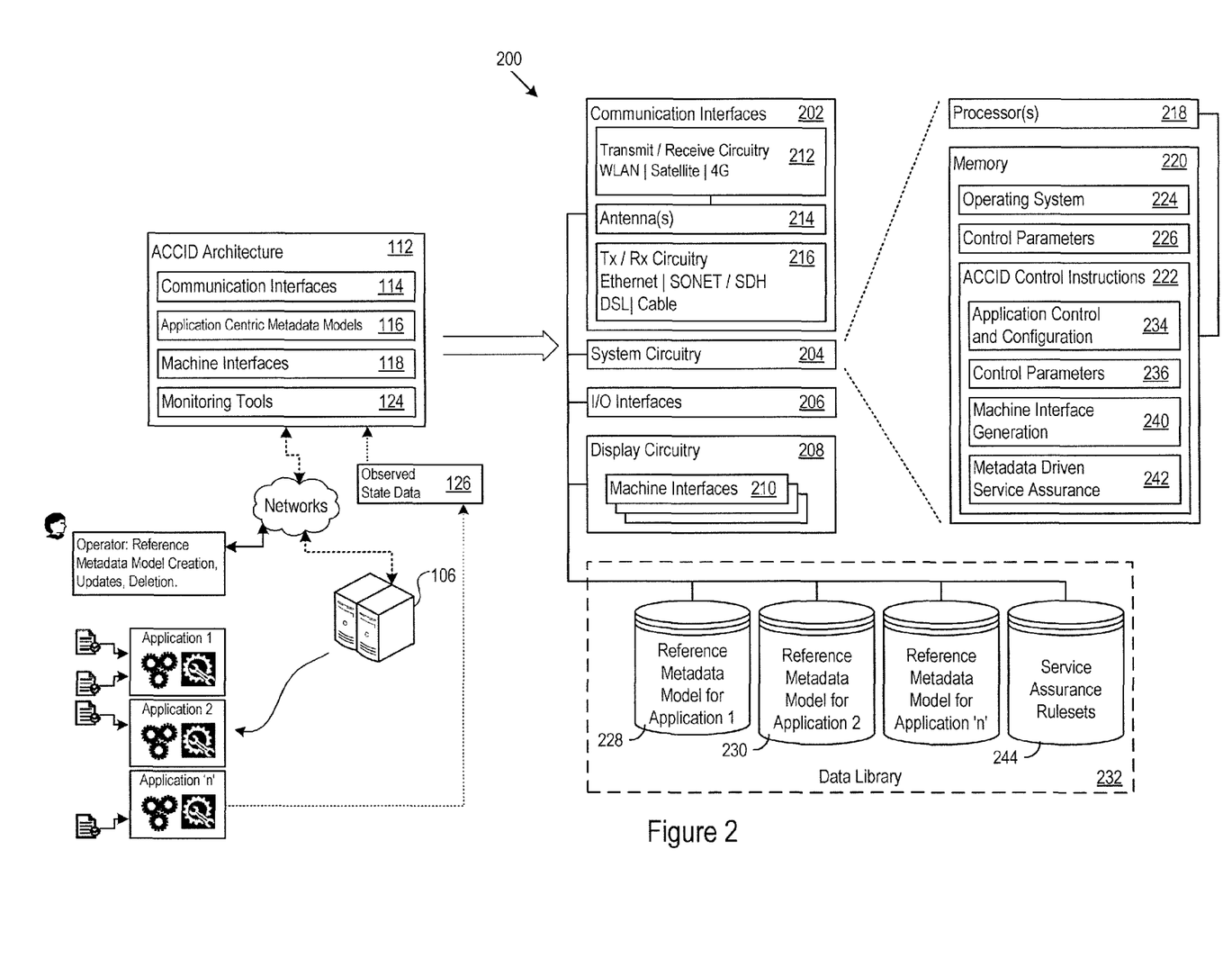
FIG. 2 shows an example implementation of an application-centric continuous delivery architecture.

FIGS. 1 and 2 provide example systems and architectures for the discussion below of the technical solutions in ACCID. The exact implementation may vary widely depending on the particular implementation context. In that respect, the technical solutions are not limited in their application or implementation to the architectures and systems shown in FIGS. 1 and 2. Instead, the technical solutions are applicable to many other system implementations, architectures, and connectivity.

FIG. 1 shows a global network architecture 100. Connected through the global network architecture 100 are geographically distributed computing platforms, such as the computing platforms 102, 104, 106, and 108. The computing platforms 102-108 host and execute any number of applications of any type. A few examples include: web servers; database management systems; data analytics software; computational chemistry applications; messaging systems (e.g., email, text, and chat systems); cloud computing order provisioning and instantiation services; and product ordering, delivery, and logistics systems.

Throughout the global network architecture 100 are networks, e.g., the network 110. The networks provide connectivity between the computing platforms 102-108 and the ACCID architecture 112. The networks 110 may include private and public networks, traditional and software defined, and may be configured over any pre-determined and possibly dynamic internet protocol (IP) address ranges.

The architecture 112 performs complex technical application lifecycle management. In the view shown in FIG. 1, the architecture 112 includes communication interfaces 114, application-centric metadata models 116, application-centric delivery circuitry 118, and machine interface generation circuitry 120. The communication interfaces 114 connect the ACCID architecture 112 to the networks 110 and the computing platforms 102-108. Application lifecycle configurations 122 travel between the ACCID architecture 112 and other systems, such as from network connected enterprise endpoints 150 to the ACCID architecture 112 to configure the ACCID architecture 112. That is, network connected operators 152 may configure the ACCID architecture 112 to perform any of the processing noted below. The application lifecycle configurations 122 may include messages, parameters, or instructions of any kind relating to application management, including, as a few examples, infrastructure provisioning instructions, source code compilation instructions, metadata model updates and configurations, and application hosting and execution instructions. The machine interface generation circuitry 120 delivers machine interfaces (e.g., sets of linked Graphical User Interfaces (GUIs)) that facilitate efficient interaction with the ACCID architecture 112 regarding the application lifecycle management.

Note also that the ACCID architecture 112 include monitoring tools 124. These tools facilitate the metadata driven service assurance described below. The monitoring tools 124 gather observed state data 126. The observed state data 126 is a measurement or sampling of the actual observed state of an application as it executes. The ACCID architecture 112 may compare the observed state data 126 against the performance expectations, characteristics, or guarantees defined within the metadata models 116. In response to the comparisons, the ACCID architecture 112 may take corrective actions, log performance data, issue performance reports, alert system operators, update reporting GUIs, or take other actions. Examples of monitoring tools 124 include, e.g., the Splunk™ tools for log collection and correlation, AppDynamics™ tools for application performance monitoring, and Inspec™ tools for configuration verification.

FIG. 2 shows an example implementation 200 of the architecture 112. The example implementation 200 includes communication interfaces 202, system circuitry 204, input/output (I/O) interfaces 206, and display circuitry 208 that renders machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include physical transceivers 216. The physical transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the architecture 112. As just one example, the system circuitry 204 may include one or more instruction processors 218 and memories 220. The memory 220 stores, for example, ACCID control instructions 222 and an operating system 224. In one implementation, the processor 218 executes the ACCID control instructions 222 and the operating system 224 to carry out any desired functionality for the architecture 112. The control parameters 226 provide and specify configuration and operating options for the ACCID control instructions 222, operating system 224, and other functionality of the architecture 112.

The architecture 112 may include databases and database table structures in a data library 232 hosted on volume storage devices, e.g., hard disk drives (HDDs) and solid state disk drives (SDDs). The storage devices may define and store database table structures that the ACCID control instructions 222 access, e.g., through a database control system, to perform the functionality implemented in the ACCID control instructions 222.

In the example shown in FIG. 2, the data library 232 stores one or more reference metadata models, e.g., the reference metadata models 228 and 230. The reference metadata models describe the components of an application, e.g., database structure, CPU/Memory specifications, and software layer elements. The components in the metadata model define an application fingerprint for the application.

The reference metadata models contextualize the configuration of any pre-defined ALM tools in communication with or under control of the architecture 112. Examples of ALM tools include: version management tools, build automation tools, test automation tools, artifact management tools, infrastructure build tools, and automated application deployment tools. The architecture 112 responds to the reference metadata model for any given application to automatically configure the ALM tools for each application and automate the execution of the ALM tools in a standardized way. The reference metadata models may, for instance, bind selected tools to components of the application fingerprint to facilitate ACCID. In one implementation, an operator builds the reference data models, including the bindings, through interactions with a reference model GUI portal that the architecture 112 defines and delivers, e.g., via the machine interface generation instructions 240.

The reference metadata models drive the automation of the ALM tools. The architecture 112 may offer or define template metadata models in a template catalog, with the template metadata models defining standardized functionality (e.g. for how a typical application is provisioned, built, tested, and deployed), and allow the application owner or enterprise operator to customize any template for specific applications and policies. In that respect, the metadata models may also explicitly define what additional metadata the application owner must provide to register their application with the architecture 112. Technical benefits of the template metadata models and metadata model customization include facilitating implementation in the architecture 112 of a shared service model through which IT organizations can efficiently manage disparate and numerous complex applications consistently and in accordance with any predefined IT Policy and enterprise governance. At the same time, the architecture 112 decentralizes the administration to each business application owner, e.g., through administrative GUI interfaces, to drive greater efficiencies within the enterprise.

For instance, the metadata model may define lifecycle build and deployment options for an application. In that regard, the metadata may define parameters for a version control tool for an application, to create and define an environment or repository in which the development team stores the application code as it is developed. The metadata may further provide configuration details for a build management tool so that when a developer changes the software in the repository, the build tool is setup to automatically build the new application version and execute test scripts. The metadata may further specify that after the tests have passed, a deployment tool will carry out a deployment of the new build version to an execution environment. If the execution environment does not yet exist, the metadata may also define and specify where and how the execution environment should be provisioned, e.g. on a public or private cloud host, and with what resources, e.g., number of servers, databases, network connections, CPU, RAM, and disk space, so that a provisioning tool may automate the creation of the execution environment.

To that end, the control instructions 222 may include application control and configuration instructions 234. The application control and configuration instructions 234 execute application control and configuration tasks guided by the established reference metadata model built specifically for that application. The application control and configuration instructions 234 are also responsive to application control parameters 236 that guide the operation of the configuration instructions 234. Examples of control parameters 236 include: time or frequency of application builds; source code control system identifiers; and private, public, or hybrid cloud location for hosting the built applications.

The data library 232 with application metadata models, application control and configuration instructions 234, control parameters 236, and machine interface generation instructions 240 improve the functioning of the underlying computer hardware itself. That is, these features (among others described below) are specific improvements in way that the underlying computer system operates. The improvements facilitate more efficient, accurate, consistent, and precise execution of complex application configuration and lifecycle characteristics, using fewer resources, across a wide range of application platforms whether local or remote, and according to any pre-determined governance model chosen by an organization.

Note also that the example implementation 200 includes metadata driven service assurance logic 242, e.g., as part of the ACCID control instructions 222. As noted above, the monitoring tools 124 gather observed state data 126. The observed state data 126 provides a snapshot of the current state of a deployed application. The observed state data 126 is provided to the assurance logic 242 for analysis and response.

For instance, the ACCID architecture 112 may compare the observed state data 126 against the performance expectations, characteristics, or guarantees defined within the metadata models in the data library 232. In response to the comparisons, the ACCID architecture 112 may take any pre-configured actions that follow the pre-defined service assurance rulesets 244. Some examples of pre-configured actions include taking corrective actions to bring an application back into compliance with the metadata model for that application, logging performance data, suspending the application execution, reconfiguring the application back into compliance, issuing performance reports, alerting system operators, updating reporting GUIs defined among the machine interfaces 210, or taking other actions.

The improved functioning of the underlying computer hardware itself achieves further technical benefits. For example, the architecture 112 avoids lack of automation, reduces manual intervention, reduces the possibility for human error, and therefore increases application control efficiency and reduces wait times. The architecture 112 also avoids a lack of centralization for service management, and the typically associated increased hardware, software, and maintenance costs. The architecture 112 helps to ensure that the application control and configuration tools are configured consistently and in accordance with policy and governance defined by an enterprise.

ACCID Examples

Figure 3:
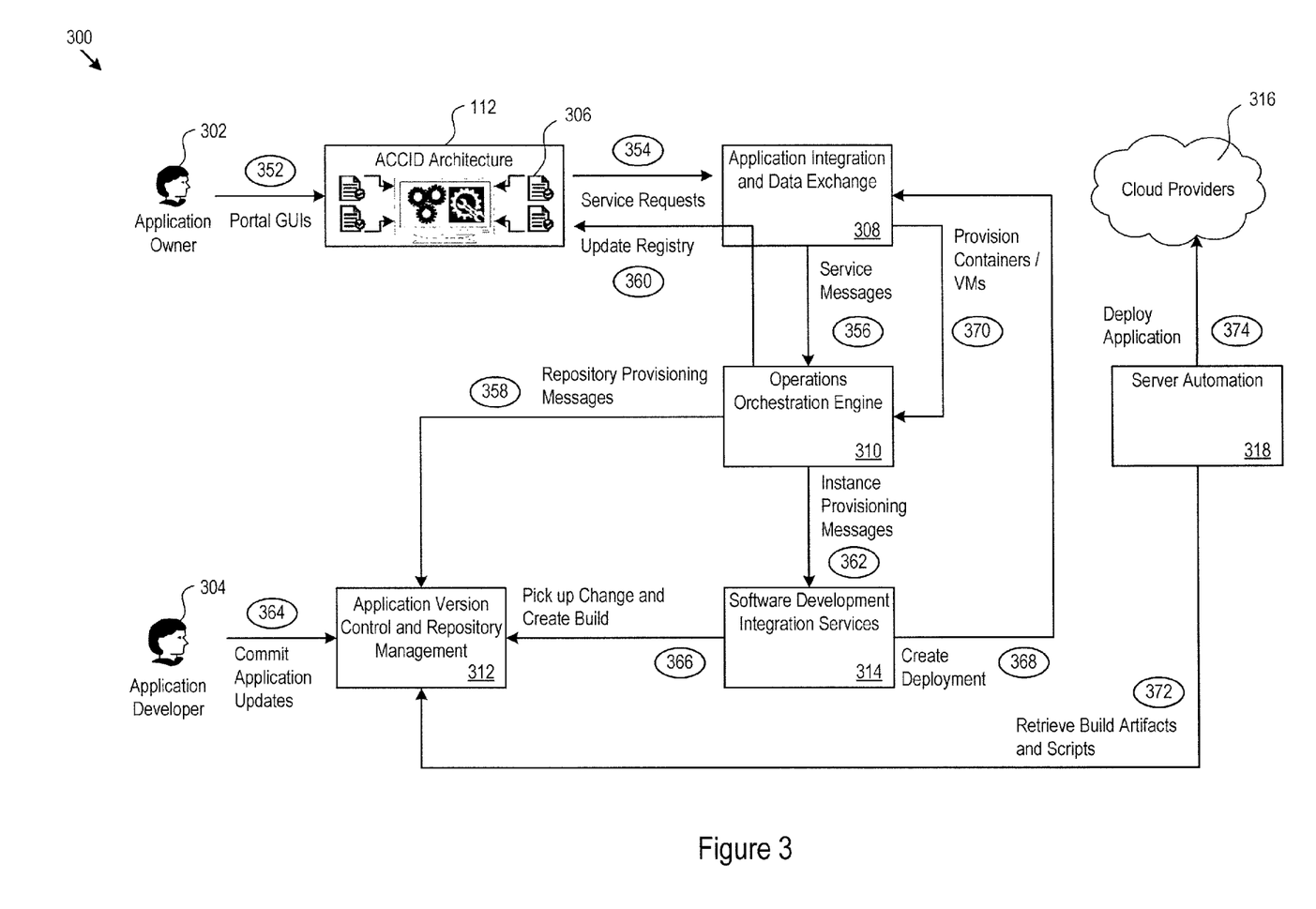
FIG. 3 shows an example flow diagram for application version management, build automation, and application deployment executed by the application-centric delivery architecture.

FIG. 3 shows an example flow diagram 300 for application version management, build automation, and application deployment executed by the architecture 112. In this example, an application owner 302 provides input regarding application control and management through portal GUIs, and an application developer 304 carries out and commits application code updates. The application owner 302 may, for instance, define and update an application specific metadata model (e.g., the metadata model 306). The application owner 302 may also link services to the metadata model and direct the architecture 112 to carry out the services (e.g., automated configuration, control, application builds, testing, and deployment) according to the application specific metadata model 306.

In FIG. 3, the application owner 302 accesses the architecture 112 through portal interfaces (e.g., a custom registration GUI and presentation layer running on, e.g., a ServiceNow™ API) and registers their application (352). The custom registration GUI is configured to facilitate application registration, including, as a few examples, obtaining metadata for owner contact, application names, associate services and environments, department or organization running the application, services, databases, platforms, operating systems, and application versions that characterize the application. To this end, the architecture 112 may access pre-defined data dictionaries that guide the registration process, to identify and ask for metadata that the architecture 112 will collect on a per-application basis.

The registration may also permit the application owner 302 to associate or assign services to the application, e.g., a version management service, a build management service, a testing service, and an application deployment service. The architecture 112 coordinates the execution of the services. To that end, the architecture 112 may instruct application integration and data exchange logic 308 (e.g., BizTalk messaging) what services to perform and when (354).

The data exchange logic 308 issues services messages (356) to an operations orchestration engine 310 (e.g., the HPOO™ engine). The orchestration engine 310 executes parameterized workflows for services associated to the application. For instance, the orchestration engine 310 may request that the source code repository system 312 (e.g., a GitLab service) provision an application repository and source control project for the application (358), if none already exists for the application. The orchestration engine 310 sets up the repository, as driven by the application-centric metadata, to achieve an enterprise standard and compliant way to provide application version control and storage.

Once the repository is up and running, the orchestration engine 310 may update the architecture 112 and application metadata with the new endpoint (e.g., IP address, web address, authentication and authorization details) for the repository (360). The architecture 112 or orchestration engine 310 communicates the endpoint details to the application developer 304. The application developer 304 may then publish their source code into the new source code project, as well as make changes to the source controlled project.

Note also that the orchestration engine 310 may issue messages through predefined APIs to the integration services system 314 (e.g., a Jenkins™ system) (362), e.g., when the application owner 302 has associated build control with the registered application. The integration services system 314 monitors (e.g., by polling) the source code repository system 312. When, for example, the application developer 304 commits a source code change (364), the integration services system 314 detects the change and executes a build on the application (366) to produce an application binary. In some implementations, the architecture 112 also provisions artifact repositories or provides access to existing artifact repositories. For example, the repositories may include a build repository where the current output of the build is stored, including, e.g., the application binary, complied code libraries, and other artifacts. The repositories may also include a reference repository in which the architecture 112 stores artifacts that meet any pre-defined artifact validation inclusion criteria. The reference repository stores artifacts that have been tested or validated, e.g., the "gold" version of artifacts. For instance, inclusion criterion for the reference repository may include: that the artifact is reviewed, vetted, or otherwise approved for re-use; that the artifact is maintained by the enterprise; that the artifact has successfully passed a pre-defined sequence of testing stages; or other criterion or combinations of criterion. If testing services are associated with the application, the integration services system 314 may execute metadata specified test scripts against the new application binary. The integration services system 314 may execute pre-defined templates provided by the architecture 112. The templates may, for example, include instructions for the integration services system 314 to call an ACCID hosted web-service to inform the application owner 302 and developer 304 which tests have run, and the test results.

After a build and any specified testing, the integration services system 314 may execute application deployment services. In FIG. 3, for instance, the integration services system 314 may inform the data exchange logic 308 and architecture 112 that a deployment is ready to be created for the new application binary (368). The application owner 302 may schedule deployment according to various options that may be captured in the application specific metadata. For example, the deployment may happen upon a successful build of the application binary, e.g., successful compilation and testing without errors.

The architecture 112 creates an application deployment responsive to the information received from the integration services system 314. The application deployments are likewise configured by the application owner 302 via the application metadata. The architecture 112 may define a deployment as a mapping of the services within the application (e.g., a database, API, and web service, an identification and location of the application binary to execute) to the infrastructure components that provide and implement those services, e.g., within a cloud service provider 316. For instance, the mapping may specify that the application API runs on a specific virtual machine (VM) hosted by a specific cloud provider. The architecture 112 provides the deployment to the orchestration engine 310 (370).

For deployment, a server automation system 318 (e.g., the HPSA server automation system) may run, e.g., a pre-deployment script, then a deployment script, then a post-deployment script. The server automation system 318 performs pre-defined deployment actions against the cloud provider 316. The server automation system 318 may, for instance, retrieve the build artifacts (e.g., the compiled binaries) and the pre-deployment, deployment, and post-deployment scripts from the source code repository system 312 (372). The server automation system 318 may deliver the build artifacts and deployment scripts to the cloud provider 316 and VM instance for the application (374). The cloud provider 316 then runs the scripts in the correct sequence to deploy the build artifacts (e.g., install the compiled binary in the VM), with real-time feedback on deployment status delivered to the architecture 112. The server automation system 318 may, for instance, also deploy enterprise agents on the operating system that execute or cooperate in service assurance and security monitoring in order to monitor and maintain compliance with pre-defined enterprise architecture and security standards.

The architecture 112 supports many types of automated behavior in addition to those described above in connection with ACCID. For instance, the architecture 112 supports Version Control, which includes an application owner submitting a request for a repository for their application. In that regard, the architecture 112 provides to the automation tools, e.g.: identity information to automatically create accounts if they do not already exist within the version control repository; the target name of the repository; and other repository setup parameters. The architecture 112 also supports build automation, which includes an application owner submitting a request for a project. For these request, the architecture 112 may provide and apply the following metadata, as examples: type of project and target type, e.g., development, test, pre-production, or production; build trigger, e.g., on code check-in, on a specific schedule, or on demand. As another example, the architecture 112 provides artifact management, facilitating storage and retrieval of artifacts in artifact repositories such as the reference repository and build repository described above. In some implementations, the architecture 112 provides deployment automation as well. In such cases, the metadata model may specify application deployment parameters such as: the target environment type (e.g., development, test, pre-production, or production); location of of pre, deploy, and post automation scripts; the build trigger, e.g., on a successful build, on schedule, or on demand; and the mapping of services to virtual machines where the services should be deployed. In terms of environment automation, the metadata model in the architecture 112 may specify parameters including: software defined networking configuration; virtual machine configuration; storage management; and service mapping, e.g., to virtual machines where the services should be deployed.

The architecture 112 also provides metadata driven service assurance. In one implementation, the architecture 112 fulfills service requests in an automated manner for the delivery of application workloads into target environments through the metadata model. The architecture 112 executes integrated processes that meet enterprise security control standards to enhance security across multiple dimensions. Examples include: network management, including setup and configuration of firewall, global traffic managers, and VPNs; and integration with anti-virus, intrusion detection tools, data loss prevention tools, and security monitoring tools through agents. The architecture 112 may automate the deployment and configuration of these service agents on a specified virtual machine as part of the build process. The metadata driven service assurance automates monitoring application environments for undesirable differences or changes by comparing what was deployed via the metadata driven automation to how the application is operating in the real world.

Figure 4:
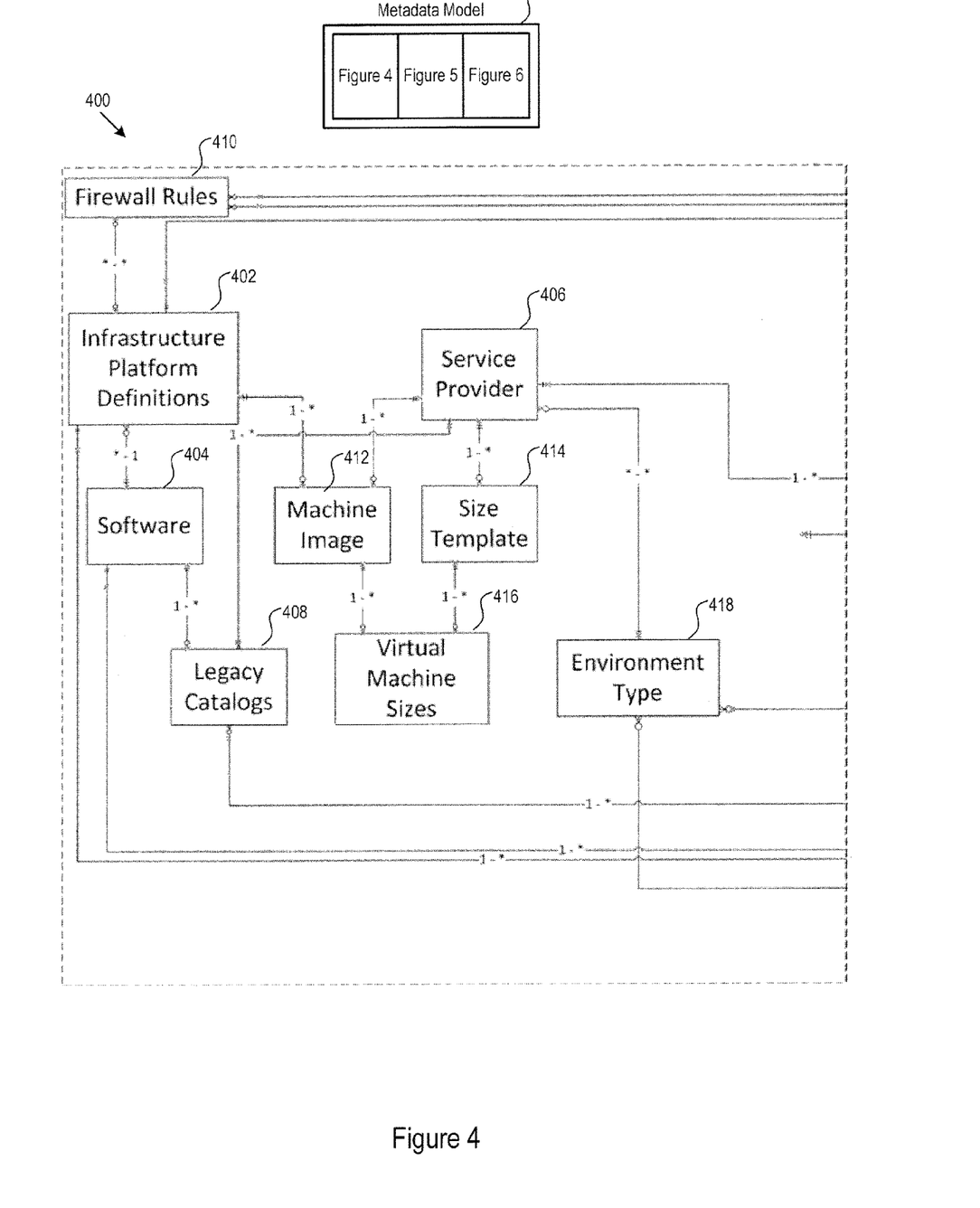
FIGS. 4, 5, and 6 show one example of a set of linked tables that form a metadata model.
Figure 5:
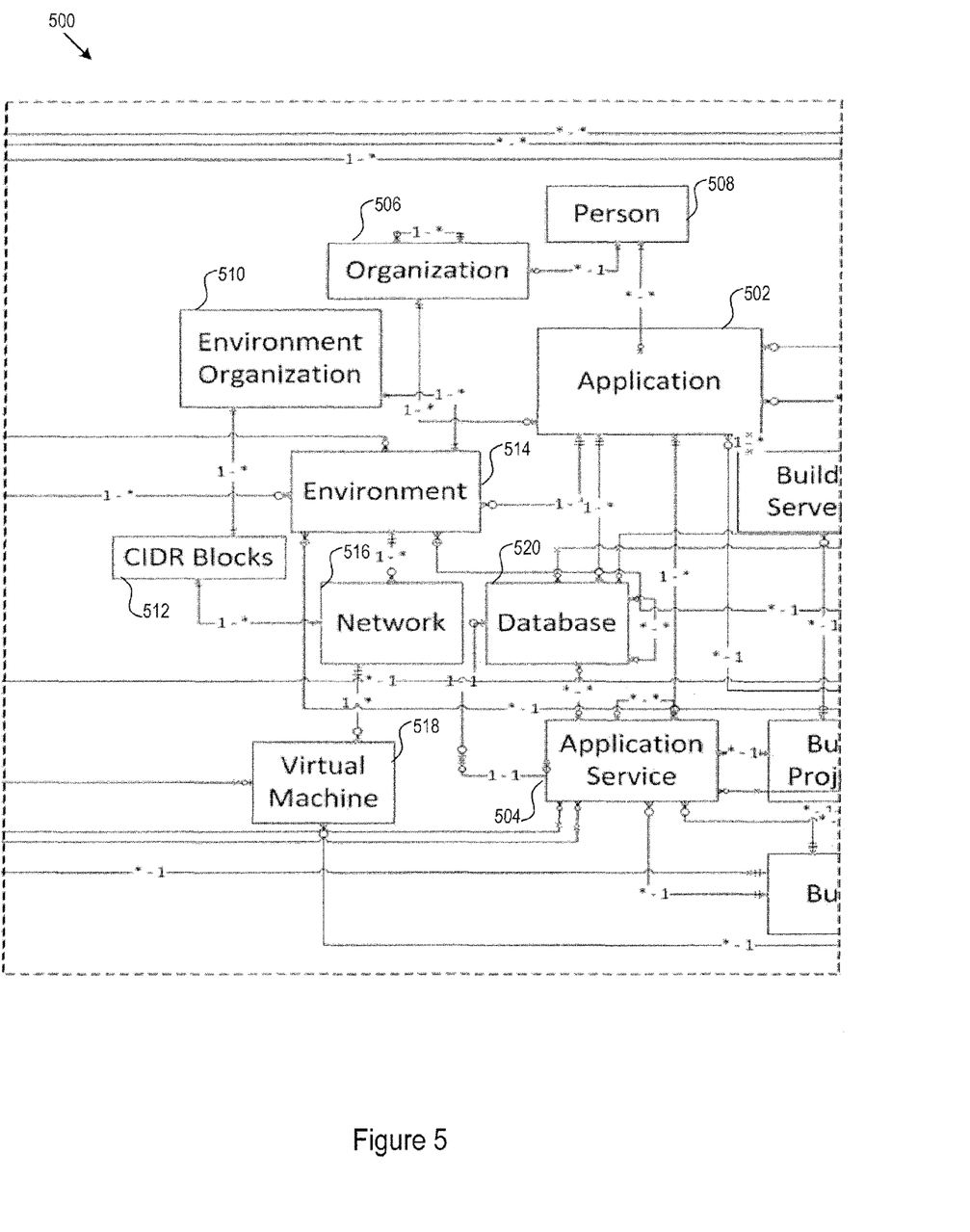
Figure 6:
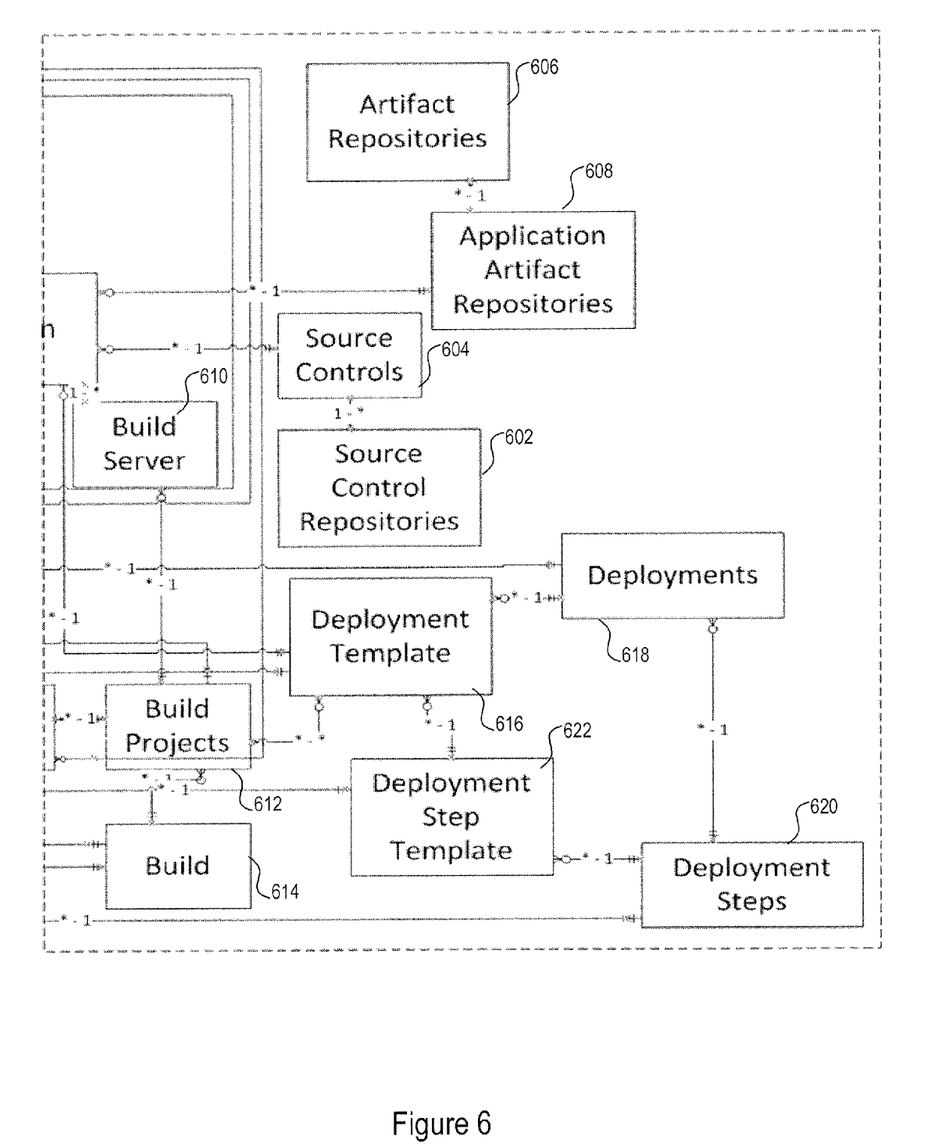

FIGS. 4-6 shows an example metadata model 490 stored as a set of linked tables 400, 500, 600. In the particular example show in FIGS. 4-6, the metadata model spans the three Figures from left to right and includes the specific tables explained below. However, the architecture 112 may implement many other variations of the metadata model depending on the particular implementation. That is, any given metadata model may include additional, fewer, or different tables depending on the functionality desired for the implementation in question. The table description below is only one example implementation corresponding to the particular model spanning FIGS. 4, 5, and 6.

In FIG. 4:

Infrastructure Platform Definitions Table 402:

Provides metadata that describes a web, middleware, or database platform. Metadata can include software rules, firewall rules, and other types of metadata.

Software Table 404:

Software entities represent a software package. Metadata may include the operating system on which the software package is deployed to.

Cloud Service Provider Table 406:

Cloud Service Providers represent execution environments whether physical or virtual, or, on-premises or in the cloud. Elements of a cloud service provider definition include the services that are available within that service provider, e.g., the service catalog for that provider.

Legacy Catalog Table 408:

Legacy Catalogs define possible operating systems, platforms, and database versions for building the application contextual model for a legacy and or non-standard application.

Firewall Rules Table 410:

Firewall Rules define the ports and protocols needed for platforms and application services installed and running on virtual machines.

Machine Image Table 412:

Machine Images are the base operating system template for a virtual machine. This table defines the identifier for the service provider to install the operating system and the platform that should be installed with it.

Size Templates Table 414:

Size templates are standardized sizes for virtual machines that are derived from sizes specified be the cloud service provider. They define the available memory, disk size, cores and costs to run the virtual machine.

Virtual Machine Size Table 416:

This table defines the available size templates for a given machine image that a application owner can choose from when creating virtual machines.

Environment Types Table 418:

Defines the types of environments that can be provisioned within a service provider. The environment type controls whether approvals for infrastructure are needed. (e.g. Dev, Test, Production)

In FIG. 5:

Application Table 502:

An application represents a collection of services and their configuration within one or more execution environments. An application is the primary unity of currency within the ACCID architecture and represents the basis for delivering application-centric service delivery and service assurance. The application entity along with its associations with other entities represent the metadata that defines the application contextual model, which in turn drives the automation and service assurance components.

Application Service Table 504:

An application service (or micro-service) represents the metadata that describes a component of the application architecture. An application service is then associated with platform that it runs on, can have a build project, and can be associated with one or more VM's across different execution environments, e.g., the Development or Test environment.

Organization Table 506:

Organization is a container for a portfolio of applications.

Person Table 508:

Represents the identity of users of the system. Persons can be assigned as points of contacts for the application and participate in workflows and approvals.

Environment Organization Table 510:

Environment Organizations define the account and/or subscription details that an environment will be provisioned in.

CIDR Blocks Table 512:

CIDR Blocks are the range IP addresses within a service provider given to a network at the time of provisioning.

Environments Table 514:

This table defines virtual areas within a service provider that contain related networks and virtual machines. Environments are associated with an Application.

Networks Table 516:

This table defines virtual networks that may be used to facilitate communication of virtual machines within the network and between other networks.

Virtual Machines Table 518:

This table defines virtual machines that establish emulations of a physical computer system, provisioned and hosted in a cloud service provider.

Databases Table 520:

Databases are metadata that which define the necessary platforms, firewall rules and dependencies necessary to host a database on a virtual machine.

In FIG. 6:

Source Control Repositories Table 602:

This table defines which source controls are available to create users and repositories in for applications.

Source Control Table 604:

This table defines the application and the source control repository where the application's repository is provisioned.

Artifact Repositories Table 606:

This table defines which artifact repositories are available to create users and repositories in for applications.

Application Artifact Repository Table 608:

This table defines the application and the artifact repository where the application's repository is provisioned. In this table, an application artifact repository may be marked as the reference repository for "gold" artifacts.

Build Servers Table 610:

This table defines which build servers are available to create users and build projects in for applications.

Build Project Table 612:

A Build Project defines how a project should be configured and provisioned within a build server. An application service can have one build project for each environment type defined in the service catalog.

Builds Table 614:

Builds is an auditable representation of the builds created in a build server for a given build project. The build contains the build result for the project and the build number.

Deployment Template Table 616:

This table defines the target environment, the build projects to be deployed in that environment, the frequency and schedule in which the projects should be deployed.

Deployment Table 618:

A Deployment represents the auditable representation of a deployment once it is started. Deployment records contain the overall status of the deployment and the related deployment template.

Deployment Step Template Table 620:

This table defines the steps, application service and the scripts to deploy the application service that are necessary to complete a deployment defined in the deployment template.

Deployment Step Table 622:

This table defines the auditable steps created once a deployment is started. A deployment step contains the status of the deployment step and the virtual machine where the application service defined in the related deployment step template is deployed.

The architecture 112 provides a service that automates the configuration and management of end-to-end ALM tools, through an innovative application-centric metadata model that can be customized through a self-service portal. With the architecture 112, IT organizations can provide version management, build automation, test automation, artifact management, infrastructure build, and automated application deployment that is consistent with global IT policy and governance and delivered as a service to their business customers. The architecture 112 references application metadata models that describe the application services, ALM requirements, and target infrastructure, to employ end-to-end automation of: the software deployment lifecycle and promotion across application environments (e.g., Development, Test, Pre-Production, and Production environments), using private, public, or hybrid cloud deployment models.

Some of the technical benefits of the architecture 112 include allowing application owners to decrease the time required to release applications through end to end release automation, stricter control over how code is deployed which helps to eliminate human error in the process, and greater visibility and transparency supporting oversight and continuous process improvement.

Expressed another way, the architecture 112 includes machine interface circuitry defining an application registration interface. The interface definition may be a set or series of linked GUIs through which an application owner navigates to accomplish application registration and service linking and application control and configuration. A communication interface delivers the application registration interface to an application owner, e.g., as HTML5 web page data.

In the architecture 112, application configuration circuitry registers a specific application through the application registration interface. To that end, the application configuration circuitry may associate the specific application with an application-specific metadata model comprising application contextual metadata for the specific application, associate the application, via the application-specific metadata, to pre-defined services, and store the application-specific metadata model in a data library of reference metadata models for applications. The application configuration circuitry executes the pre-defined services for the specific application according to the application-specific metadata model for the specific application.

The application-specific metadata model may store enterprise-wide standardized configuration and control metadata for the enterprise that includes the application owner. The pre-defined services may vary widely. As one example, the pre-defined services include an application version control service configured according to the enterprise-wide standardized configuration and control metadata. The application version control service may include an application repository and source code control service (among other resources) for the specific application.

As another example, the pre-defined services may include an application build service operable to check for application changes and compile new application binaries, as specified by the enterprise-wide standardized configuration and control metadata. A further example is an application test service operable to execute tests against a newly compiled application binary, as specified by the enterprise-wide standardized configuration and control metadata. Yet another example is an application deployment service operable to deploy a newly compiled application binary into a pre-defined execution environment, as specified by the enterprise-wide standardized configuration and control metadata.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:
1. A system comprising:
    machine interface circuitry defining an application registration interface;
    a communication interface configured to deliver the application registration interface to an application owner; and
    application configuration circuitry configured to:
        register a specific application through the application registration interface by:
            associating the specific application with an application-specific metadata model comprising enterprise-wide standardized application configuration and control metadata for an enterprise that includes the application owner;
associating application end-to-end lifecycle services comprising:
an application version control service configured according to the enterprise-wide standardized application configuration and control metadata;
an application repository and source code control service for the specific application configured according to the enterprise-wide standardized application configuration and control metadata;
an application build service operable to check for application changes and compile new application binaries, and configured according to the enterprise-wide standardized application configuration and control metadata;
an application test service operable to execute tests against a newly compiled application binary, and configured according to the enterprise-wide standardized application configuration and control metadata; and
an application deployment service operable to deploy a newly compiled application binary into a pre-defined execution environment, and configured according to the enterprise-wide standardized application configuration and control metadata; and
executing the application end-to-end lifecycle services for the specific application.

2. The system of claim 1, where:
the application-specific metadata model for the specific application comprises application deployment metadata.

3. The system of claim 2, where the application deployment metadata specifies application deployment conditions for automatically deploying a newly compiled application binary.

4. The system of claim 3, where the application deployment conditions comprise a compilation result condition, a test result condition, or both.

5. The system of claim 3, where the application end-to-end lifecycle services further comprise an application build service for the newly complied application binary.

6. The system of claim 5, where the application build service is configured to execute metadata driven service assurance by automatically deploying service agents on a specified virtual machine.

7. The system of claim 5, where the application build service is further configured to provide access to a build repository configured to store output of a current application build.

8. The system of claim 5, where the application build service is further configured to provide access to a reference repository configured to store application artifacts that meet pre-defined artifact validation inclusion criteria.

9. A method comprising:
at machine interface circuitry, defining an application registration interface;
at a communication interface, delivering the application registration interface to an application owner; and
at application configuration circuitry:
registering a specific application through the application registration interface by:
associating the specific application with an application-specific metadata model comprising enterprise-wide standardized application configuration and control metadata for an enterprise that includes the application owner;
associating application end-to-end lifecycle services comprising:
an application version control service configured according to the enterprise-wide standardized application configuration and control metadata;
an application repository and source code control service for the specific application configured according to the enterprise-wide standardized application configuration and control metadata;
an application build service operable to check for application changes and compile new application binaries, and configured according to the enterprise-wide standardized application configuration and control metadata;
an application test service operable to execute tests against a newly compiled application binary, and configured according to the enterprise-wide standardized application configuration and control metadata; and
an application deployment service operable to deploy a newly compiled application binary into a pre-defined execution environment, and configured according to the enterprise-wide standardized application configuration and control metadata; and
executing the application end-to-end lifecycle services for the specific application.

10. The method of claim 9, where the application-specific metadata model for the specific application comprises application deployment metadata.

11. The method of claim 10, where the application deployment metadata specifies application deployment conditions for automatically deploying a newly compiled application binary.

12. The method of claim 11, where the application deployment conditions comprise a compilation result condition, a test result condition, or both.

13. The method of claim 11, where the application end-to-end lifecycle services further comprise an application build service for the newly complied application binary.

14. The method of claim 13, where the application build service executes metadata driven service assurance by automatically deploying service agents on a specified virtual machine.

15. The method of claim 13, where the application build service provides access to a build repository configured to store output of a current application build.

16. The method of claim 13, where the application build service provides access to a reference repository configured to store application artifacts that meet pre-defined artifact validation inclusion criteria.

17. A product comprising:
machine-readable media other than a transitory signal; and
instructions stored on the machine-readable media, the instructions configured to, when executed cause a machine to:
at machine interface circuitry, define an application registration interface;
at a communication interface, deliver the application registration interface to an application owner; and
at application configuration circuitry:
register a specific application through the application registration interface by:

associating the specific application with an application-specific metadata model comprising enterprise-wide standardized application configuration and control metadata for an enterprise that includes the application owner;

associating application end-to-end lifecycle services comprising:

an application version control service configured according to the enterprise-wide standardized application configuration and control metadata;

an application repository and source code control service for the specific application configured according to the enterprise-wide standardized application configuration and control metadata;

an application build service operable to check for application changes and compile new application binaries, and configured according to the enterprise-wide standardized application configuration and control metadata;

an application test service operable to execute tests against a newly compiled application binary, and configured according to the enterprise-wide standardized application configuration and control metadata; and an application deployment service operable to deploy a newly compiled application binary into a pre-defined execution environment, and configured according to the enterprise-wide standardized application configuration and control metadata; and executing the application end-to-end lifecycle services for the specific application.

18. The product of claim 17, where the application-specific metadata model for the specific application comprises application deployment metadata.

19. The product of claim 18, where the application deployment metadata is configured to specify application deployment conditions for automatically deploying a newly compiled application binary.

20. The product of claim 19, where the application deployment conditions comprise a compilation result condition, a test result condition, or both.

21. The product of claim 19, where the application end-to-end lifecycle services further comprise an application build service for the newly complied application binary.

* * * * *